United States Patent [19]

van der Wiel

[11] 4,408,556
[45] Oct. 11, 1983

[54] FENDER, RESPECTIVELY PLUG FOR A FENDER

[75] Inventor: Adrianus W. van der Wiel, Rijswijk, Netherlands

[73] Assignee: Vredestein N.V., The Hague, Netherlands

[21] Appl. No.: 230,993

[22] Filed: Feb. 3, 1981

Related U.S. Application Data

[63] Continuation of Ser. No. 31,103, Apr. 18, 1979, abandoned.

[30] Foreign Application Priority Data

Apr. 25, 1978 [NL] Netherlands ......................... 7804384

[51] Int. Cl.³ ............................................. B63B 59/02
[52] U.S. Cl. ................................................. 114/219
[58] Field of Search ............... 114/219, 220, 230, 179; 9/8 R; 267/140, 141; 441/23

[56] References Cited

U.S. PATENT DOCUMENTS

| 1,877,793 | 9/1932 | Beynon | 9/8 R |
| 3,339,907 | 9/1967 | Parker | 114/219 |
| 3,835,890 | 9/1974 | Miceli | 9/8 R |

Primary Examiner—Trygve M. Blix
Assistant Examiner—Jesús D. Sotelo
Attorney, Agent, or Firm—Karl W. Flocks; A. Fred Starobin

[57] ABSTRACT

Fender provided with an all-through hole for its suspension from a quay or other mooring place for ships by a chain or other type of suspension in at least one end of the hole of the fender a plug being provided for protecting the fender wall from damage by the suspension and, respectively plug for such a fender.

5 Claims, 3 Drawing Figures

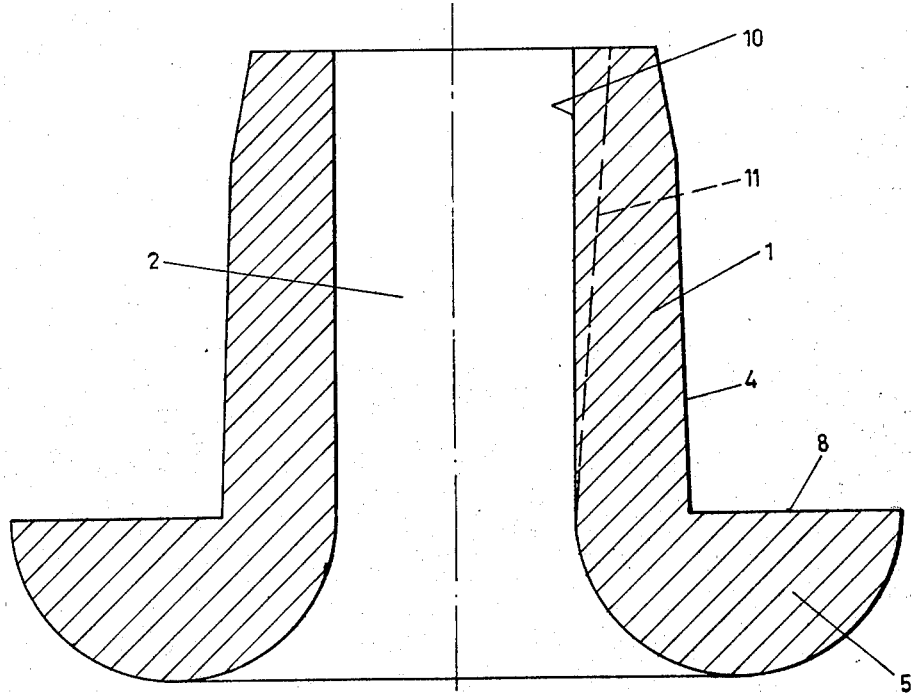
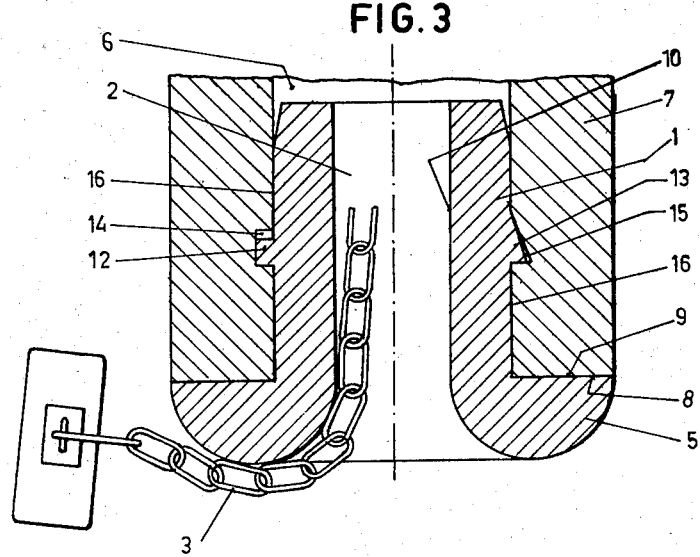

FENDER, RESPECTIVELY PLUG FOR A FENDER

This application is a continuation of application Ser. No. 31,103 filed Apr. 18, 1979 and entitled "A Fender, Respectively Plug for a Fender" of the same inventor, which application has now become abandoned.

The invention relates to a fender of the type to be suspended to a mooring place for ships.

Fenders of this type are suspended by means of chains for quays, jetties or other mooring places for ships, in such a way so that it is possible to suspend them in a vertical, horizontal or an arbitrary position.

The suspension by means of chains, however, has the drawback that the ends of the fender can be damaged by the chain, which is the case in particular when the wall thickness of the fender equals or approximately equals the length of one or more links, as the wall can then be damaged by the links before and behind this link or these links. As the fender can slide on the chain, subsequent parts of the fender will be damaged, so that the life of the fender may be reduced.

The purpose of the present invention is to overcome this drawback, which is realized with the fender according to the invention, in that it is provided in at least one of the end portions of the hole of the fender body with a plug having a hollow pin shaped portion or tap having an annular head, which covers the annular head wall of the fender and which is rounded off. As the plug has a gradual passage from the inner wall to the outer wall of its hole; the chain can well adapt itself to said passage. By using a plug at one or both ends, the advantage is obtained furthermore, that after the wear of the plug it can be replaced by a new plug before the ends of the fender are damaged. Replacing a damaged plug by a new plug is a simple job, as only one of the links of the chain by which the chain is secured to the mooring place needs to be unfastened, whereafter the damaged plug can be removed and can be replaced by a new one. As the plug is hollow, it guides the chain, so that the chain can make a wide bend.

It is observed that from the U.S. Pat. No. 1,877,793, a fender is known having an elastic body provided with an all-through hole, through which passes a suspension means. Said fender is provided at its bottom end with a cupped recess in which a heavy washer of hard rubber or metal fits in order to prevent that the suspension means is pulled through the fender. However, said known fender is a boat fender and not a fender which is designed to be secured to a mooring place.

According to the invention, the plug may taper from its end towards its head. Thus a smoother or more gradual passage of the chain into and out of the plug is obtained.

The outer wall of the tap may be provided with locking means cooperating with locking means provided in the inner wall of the all-through hole in the body of the fender.

The hollow tap may have an outer wall provided with locking means extending themselves continuously in the circumferential direction of said wall and cooperating with complimentary locking means provided in the wall of the allthrough hole in the body of the fender.

As the fender and the plug are separate parts, the plug and the fender may be made of different materials, which have the most favourable properties for the purpose which they serve. The plug is made preferably of a soft rubber or a soft synthetic material with a high resistance to tearing.

The invention will be explained hereinafter with reference to the drawing in which, by means of example, an embodiment of the plug according to the invention and the lower part of a fender provided at its lower end with such a plug, are shown.

In the drawing:

FIG. 1 shows a longitudinal section of a plug according to the invention;

FIG. 3 shows a longitudinal section of the lower part of a fender with a plug provided therein, and the lower end of the chain by which the plug is suspended.

Figure 2:
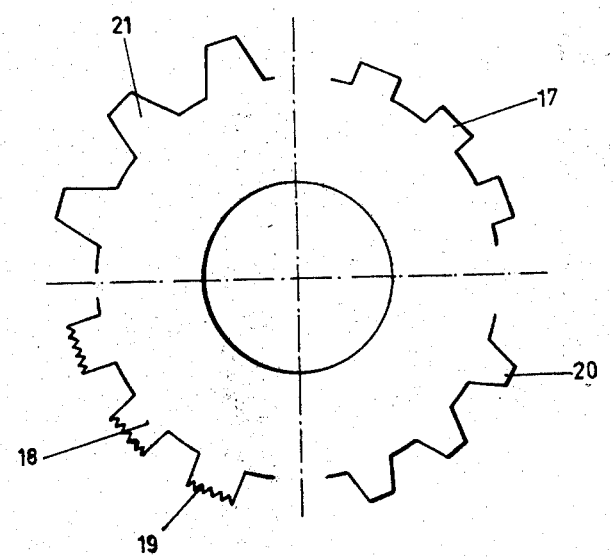
FIG. 2 shows a cross section of a plug according to the invention.

The plug 1 shown in FIG. 1 has an all-through cylindrical hole 2 for letting through a chain 3 (FIG. 3). The outer wall 4 of the plug 1 first tapers slightly from the head 5 thereof and more strongly over the last part. This allows this end to be inserted easily into the hole 6 of a fender 7, as shown in FIG. 3.

The head 5 of the plug 1 is annular, the cross section being rounded off and the upper wall 8 of the head being flat. As FIG. 3 shows, this flat upper wall 8 lies against the flat head 9 of the hollow fender 7.

The inner wall 10 of the plug 1 may be cylindrical, but it may also become wider from the head 5 on, as is shown in the right-hand part of FIG. 1 by the interrupted line 11. Thus a good, gradual passage of the chain 3 from the upper end of the plug 1 towards the head 5 thereof is obtained.

The outer wall 4 of the plug 1 is provided with projections with e.g. a rectangular shape such as the projection 12 or a conical shape such as the projection 13.

The projections 12 or 13 can be received in fitting recesses 14 or 15 which go all around the circumference and which are provided in the inner wall 16 of the fender 7. The projections 12 or 13 may be provided locally, but also over the entire circumference. It is obvious that the recesses 14 or 15 may be provided in circumferential direction in the outer wall 4 of the plug 1 and that in that case the all-around or local projections 12 or 13 are provided on the inner wall of the fender 7.

As FIG. 2 shows, the outer wall 4 of the plug 1 may be provided with ribs in the axis direction, so that variations in the inner diameter of the fender can be allowed for and always a solid fitting is obtained. The four segments of FIG. 2 show different configurations of the ribs. The ribs 17 e.g. are essentially rectangular and the ribs 18 are also almost rectangular, but the outer circumference thereof is provided with small lips 19. Furthermore several types of trapezium-shaped ribs 20 and 21 are shown. It will be obvious, however, that many different configurations may be used for obtaining specific advantages.

In principle it would also be possible to provide the inner wall of the fender with the ribs so as to obtain a fixed fitting between the fender and the plug. Providing the ribs on the plug is more favourable, as the plug extends itself only over a relatively small length of the fender.

Furthermore it will be obvious that the invention is not restricted to the embodiments shown in the drawing, but that numerous modifications may be applied without leaving the scope of the invention.

We claim:

1. A fender of the type to be suspended from a mooring place for ships, said fender comprising a body of elastic material having an annular end wall and having a hole extending through said annular end wall and all through said body, a plug removably secured in at least one of the end portions of said hole and including a pin shaped portion extending into said hole fitted for securing in said hole, and an annular head attached to said pin shaped portion, said head having a continuously curved outer surface substantially smoothly connected to the inner surface of said pin shaped portion, and substantially completely covering said annular end wall of said body, said plug having an all the way through hole extending through said annular head and said pin shaped portion and concentric with said hole extending through said body, a suspension means slidably passing over said annular head and through said pin shaped portion through said hole all through said body and having each of the ends of said suspension means secured to the mooring place at points spaced from one another, whereby said plug protects the end of the fender from sliding wear by said suspension means and allows said suspension means to freely slide through the fender.

2. Fender according to claim 1, characterized in that the hole in said pin shaped portion tapers from its end towards its head.

3. Fender according to claim 1, characterized in that said pin shaped portion has an outer wall provided with locking means cooperating with locking means provided in the inner wall of the all-through hole in said body of the fender.

4. Fender according to claim 1, characterized in that said pin shaped portion has an outer wall provided with locking means extending themselves continuously in the circumferential direction of said wall and cooperating with complementary locking means provided in the wall of the all-through hole in said body of the fender.

5. Fender according to claim 1, characterized in that said plug is made of a soft elastic material having a high resistance to tearing.

* * * * *